(12) United States Patent
Fair et al.

(10) Patent No.: US 8,322,739 B1
(45) Date of Patent: Dec. 4, 2012

(54) BOAT TRAILER STEP ASSIST

(76) Inventors: Robert Fair, Oologah, OK (US);
Michael Hacker, Oologah, OK (US)

(*) Notice: Subject to any disclaimer, the term of this patent is extended or adjusted under 35 U.S.C. 154(b) by 269 days.

(21) Appl. No.: 12/839,864

(22) Filed: Jul. 20, 2010

Related U.S. Application Data

(60) Provisional application No. 61/227,128, filed on Jul. 21, 2009.

(51) Int. Cl.
*B60R 3/00* (2006.01)

(52) U.S. Cl. .................................. 280/164.1; 280/414.1

(58) Field of Classification Search ............... 280/164.1, 280/163, 166, 414.1, 414.3, 414.2; 182/127
See application file for complete search history.

(56) References Cited

U.S. PATENT DOCUMENTS

| | | | | |
|---|---|---|---|---|
| 3,779,580 | A * | 12/1973 | Thelen ........................ | 280/164.1 |
| 4,056,270 | A | 11/1977 | Greenfield | |
| 4,094,527 | A * | 6/1978 | Miller .......................... | 414/559 |
| 4,943,076 | A | 7/1990 | Tripke | |
| 5,024,292 | A * | 6/1991 | Gilbreath et al. ............... | 182/90 |
| 5,896,946 | A * | 4/1999 | Brackett ...................... | 182/127 |
| D456,747 | S | 5/2002 | Louie | |
| 6,932,193 | B2 * | 8/2005 | Tombarello .................... | 182/93 |
| 6,986,523 | B1 | 1/2006 | Bickford | |
| 7,100,740 | B2 | 9/2006 | Newton | |
| 7,410,031 | B2 * | 8/2008 | Jensen ......................... | 182/127 |
| 2007/0000723 | A1 * | 1/2007 | Jensen ......................... | 182/127 |
| 2007/0241535 | A1 * | 10/2007 | Salyers ........................ | 280/477 |
| 2010/0025954 | A1 * | 2/2010 | Gottlinger et al. ............ | 280/166 |
| 2011/0011675 | A1 * | 1/2011 | Ebbenga et al. .............. | 182/106 |

OTHER PUBLICATIONS

B&G trailers, inc.; http://www.bgtrailers.com/pontoon-trailers.htm; Apr. 27, 2009.*
Boat-Board.Com, "Welcome to the Boat-Board "Home" Page!," Web page located at http://www.boat-board.com/.
EZEE Step Inc., "EZEE Step Boat Trailer Step," Website located at: http://www.ezeestep.com/.

* cited by examiner

*Primary Examiner* — J. Allen Shriver, II
*Assistant Examiner* — Emma K Frick
(74) *Attorney, Agent, or Firm* — Gable Gotwals

(57) ABSTRACT

A boat trailer step assist includes a first and second support arm in pivotal relation to one another which provide steps that assist a user in entering or exiting a boat when trailered or in the process of being trailered. The support arms are arranged at an angle relative to the trailer tongue, with the first step at the level of the trailer tongue. When not in use, the second support arm pivots downward for compact stowage. When deployed, the support arms are in alignment with one another. A grab handle may be provided to assist the user in climbing or descending the steps.

7 Claims, 5 Drawing Sheets

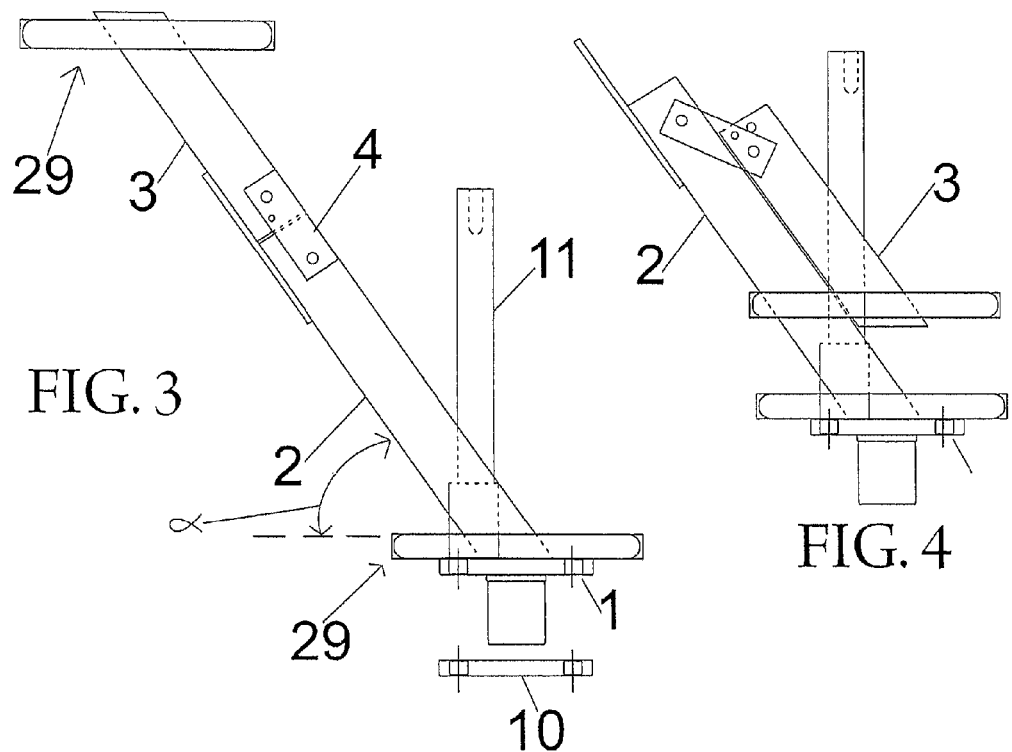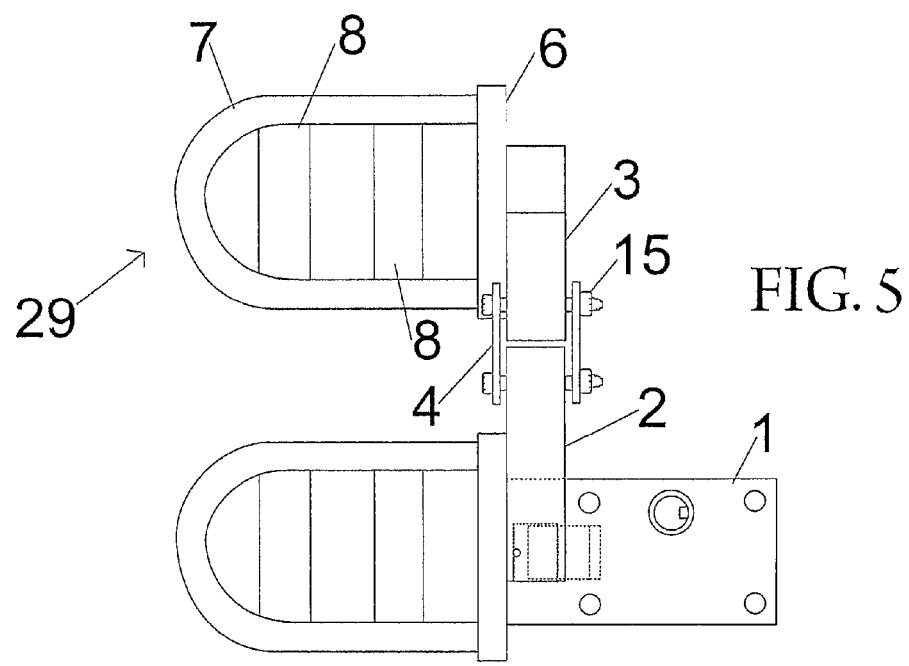

BOAT TRAILER STEP ASSIST

CROSS-REFERENCE TO PENDING PATENT APPLICATIONS

This application claims priority to U.S. Provisional Pat. App. No. 61/227,128, filed Jul. 21, 2009.

FIELD OF THE INVENTION

This invention relates generally to devices designed to assist a user in entering and exiting a boat. More particularly, the invention relates to devices designed to assist a user in entering and exiting a boat that is secured to a boat trailer or in the process of being secured to a boat trailer.

BACKGROUND OF THE INVENTION

Users of boats who are very young, above middle age, overweight, or suffering some form of physical disability or ailment often have difficulty getting into and out of the boat when the boat is trailered. Therefore, a need exists for a step assist that provides easy access to and egress from a boat that is trailered or is in the process of being trailered.

SUMMARY OF THE INVENTION

A boat trailer step assist made according to this invention has a first support arm connected to a trailer tongue and a second support arm that may move in relation to the first support arm. The first support arm is preferably a fixed arm arranged at an oblique angle relative to the trailer tongue. The second support arm preferably moves relative to the first support arm between a stowed position and a deployed position. When in the deployed position, the second support arm may be at a different vertical elevation than when it is in the stowed position.

Each support arm includes at least one step that a user uses to enter or exit a boat that is trailered or in the process of being trailered. The steps are preferably fixed in relation to the support arms but could also be in pivotal relation to the support arms. The steps, which may be U-shaped steps, may be arranged so that an end of each step lies substantially parallel to the trailer tongue.

In a preferred embodiment, the first and second support arms are in pivotal relation to one another. When in the deployed position, the first and second support arms are in alignment with one another. When in the stowed position the second support arm rests substantially parallel to the first support arm. Other arrangements between the arms may be used. For example, the first and second support arms may be in a telescoping relation to one another. Alternatively, the first and second support arms may be in fixed relation to one another. That is, the arms may form a single support arm.

The boat trailer step assist may also include a fixed or removable grab handle to assist the user in using the steps. This handle may also be adjustable and include a mirror that assists the user in seeing the trailer hitch while inside the tow vehicle.

An object of this invention is to provide a user with easy and safe entering and exiting of a boat while the boat is still on the trailer or in the process of being trailered. Another object of this invention is to facilitate a single user launching off of, or loading a boat on to, a trailer. Yet another object of this invention is to make it easy for youth, elderly and those hampered with knee, back or other physical ailments to get in and out of the boat at any location. Still yet another object of this invention is to enhance the value, looks and practicality of a boat trailer.

BRIEF DESCRIPTION OF THE DRAWINGS

FIG. 3 is a side view of the step assist of FIG. 1. When the step assist is deployed for use, the two support arms of the step assist are in alignment with one another. A grab handle may be provided to offer added safety and stability for the user.

FIG. 4 is a side view of the step assist of FIG. 1 illustrating the step assist in its stowed position. The upper and lower support arms of the step assist are connected to one another by a hinge. The upper support arm rotates up and away from the lower support arm to deploy the step assist, and rotates down and toward the lower support arm to stow the step assist.

FIG. 5 is a top view of the step assist of FIG. 3. The lower support arm is secured to a base plate which, in turn, is detachably secured to the tongue of the boat trailer. A U-shaped step is affixed to each of the lower and upper support arms.

DETAILED DESCRIPTION OF THE PREFERRED EMBODIMENTS

Figure 1:
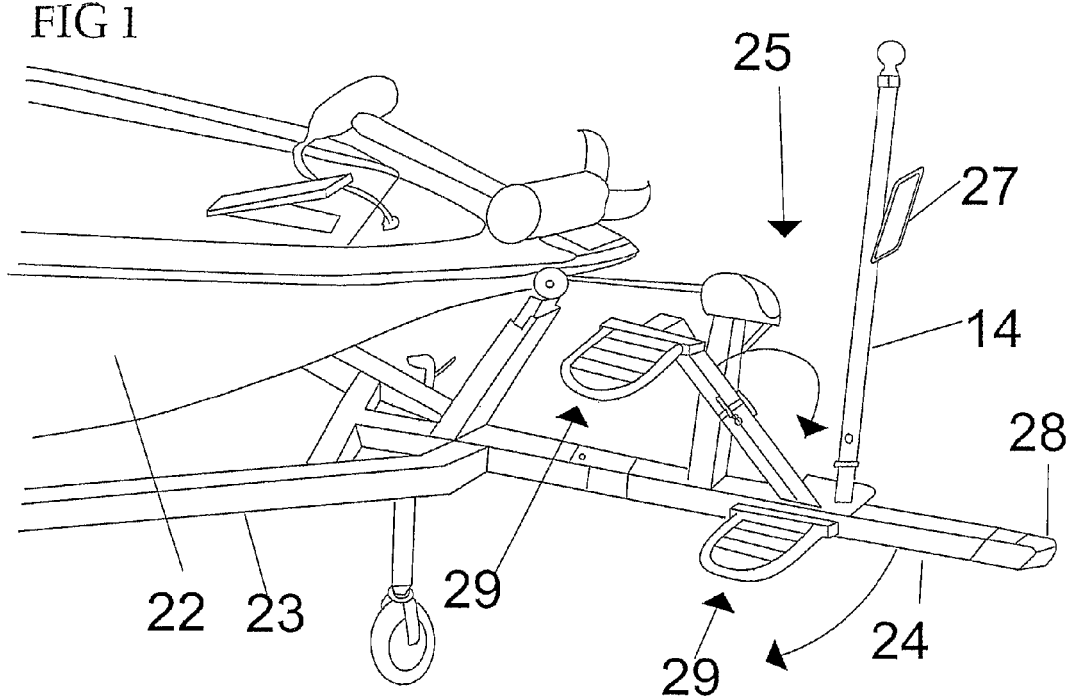
FIG. 1 is an isometric view of a preferred embodiment of a boat trailer step assist made according to this invention. The step assist, which is secured to the tongue of a boat trailer, allows a user to easily step from ground level into a trailered boat and exit from the boat back to ground level.
Figure 2:
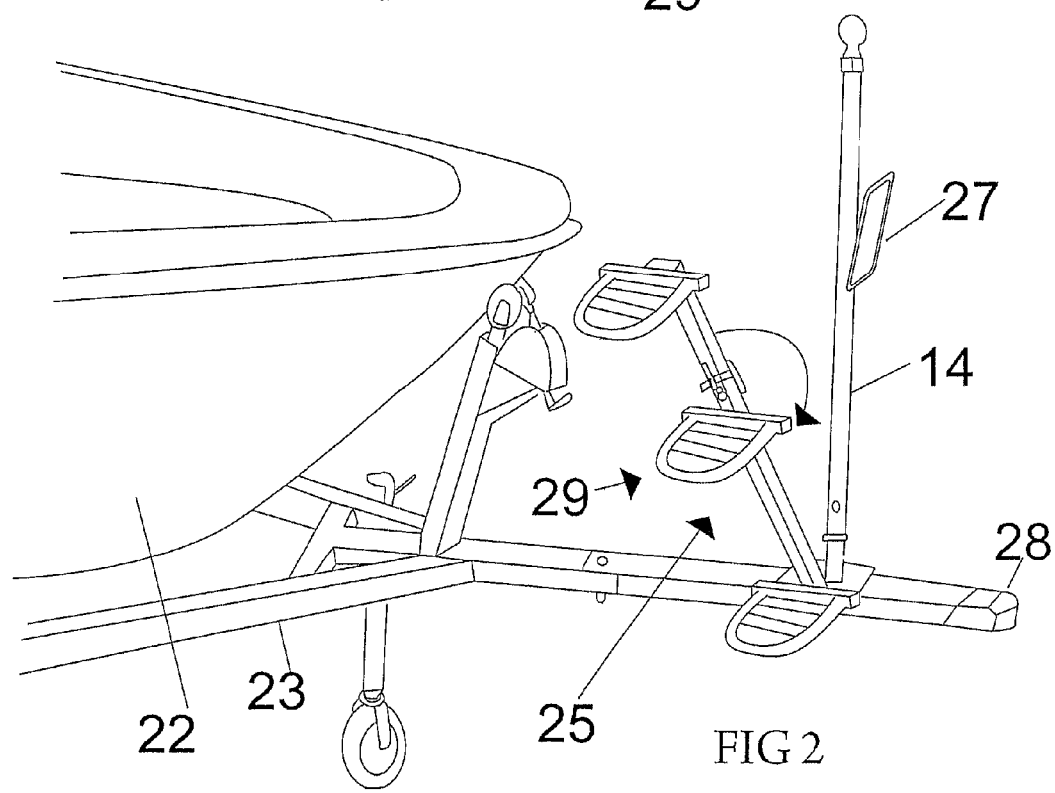
FIG. 2 is an isometric view of an alternate embodiment of the step assist of FIG. 1. Additional steps may be provided depending on the size of the boat being trailered.

Preferred embodiments of a step assist according to this invention will now be described by making reference to the drawings and the elements illustrated in the drawings. Referring first to FIGS. 1 & 2, a step assist 25 is illustrated that provides easy access to and egress from a boat 22 that is trailered or in the process of being trailered. Step assist 25 proves especially useful to users who, because of their age or size, typically have difficulty getting into and out of the boat when the boat is trailered. Depending on the size of the boat 22, step assist 25 may have one, two, or more steps 29. For example, a bass boat application typically requires two steps 29. Other types of boats, such as a ski, speed, or pleasure boat may require three or more steps 29. Step assist 25 preferably includes a grab handle 14, which may be a removable grab handle (see FIG. 3), to offer added safety and stability for the user. Grab handle 14 may also include a mirror 27 that allows the user to see the trailer hitch 28 when seated inside the tow vehicle.

Step assist 25 is detachably secured to the tongue 24 of a boat trailer 23. Trailer tongue 24 may be a structural member of boat trailer 23 that supports the weight of boat 22 and provides a connection point of boat trailer 23 to a tow vehicle (not shown). Trailer tongue 24 is typically a box beam or its equivalent, with a dimension of a few inches per side. Trailer tongue 24 may be a rotating or swing away trailer tongue (as indicated by the arrow in FIGS. 1 & 2) that helps reduce the overall length of boat trailer 23 to accommodate smaller storage areas.

Turning now to FIGS. 3 to 5, step assist 25 preferably includes a lower support arm 2 and an upper support arm 3 in pivotal relation to one another. Each support arm 2, 3 supports one or more steps 29. Step 29 may be any configuration desirable but is preferred to be a U-shaped step 29 made of frame 7 with spaced-apart step floor runners 8 spanning the U. Frame portion 6 closes the U and provides the means for securing step 29 to support arm 2 or 3. Each step 29 is oriented in relation to support arms 2, 3 so that when step assist 25 is in use, each step 29 substantially lies in a horizontal plane.

In a preferred embodiment, upper support arm 3 is connected to lower support arm 2 by way of a hinge 4. Upper support arm 3 is preferably positioned inside of hinge 4 at an upper end of the lower support arm 2 by way of a bolt 15 passing through hinge 4 at a designated location, continuing through hinge pivot 12, and protruding through the far side of hinge 4 where a lock nut may be installed on the end of bolt 15. Upper support arm 3 matches the same angular incline as lower support arm 2 when in the open for use position. Upper support arm 3 may also have a different angular incline than lower support arm 2 when in the open for use position. When step assist 25 is stowed, upper support arm 3 rests on and parallel to lower support arm 2. This rotation allows step assist 25 to become more compact and prevents any interference with boat trailer 23 when the boat trailer 23 accompanies a rotating or "swing away" trailer tongue 24. When deploying step assist 25 for use, a user rotates upper support arm 3 up and away from lower support arm 2 until the arms 2, 3 are in alignment with one another. When the user is through using step assist 25, upper support arm 3 is rotated down and toward lower support arm 2.

An alternative embodiment of step assist 25 eliminates hinge 4 and includes a single support arm 2 to which a step or steps 29 are attached. This alternate configuration is advantageous and cost effective for users whose boat trailer tongue 24 does not rotate or swing away but remains in a constant and fixed position. In these applications, there is no need for step assist 25 to fold and become compact for storage.

Lower support arm 2 is affixed to a base plate 1 at a predetermined angle α, preferably 45°, relative to trailer tongue 24. Angle α will vary depending on the type and elevation of boat 22 in relation to boat trailer 23. Lower support arm 2 supports one or more steps 29 as well as provides the attachment location for hinge 4.

Figure 6:
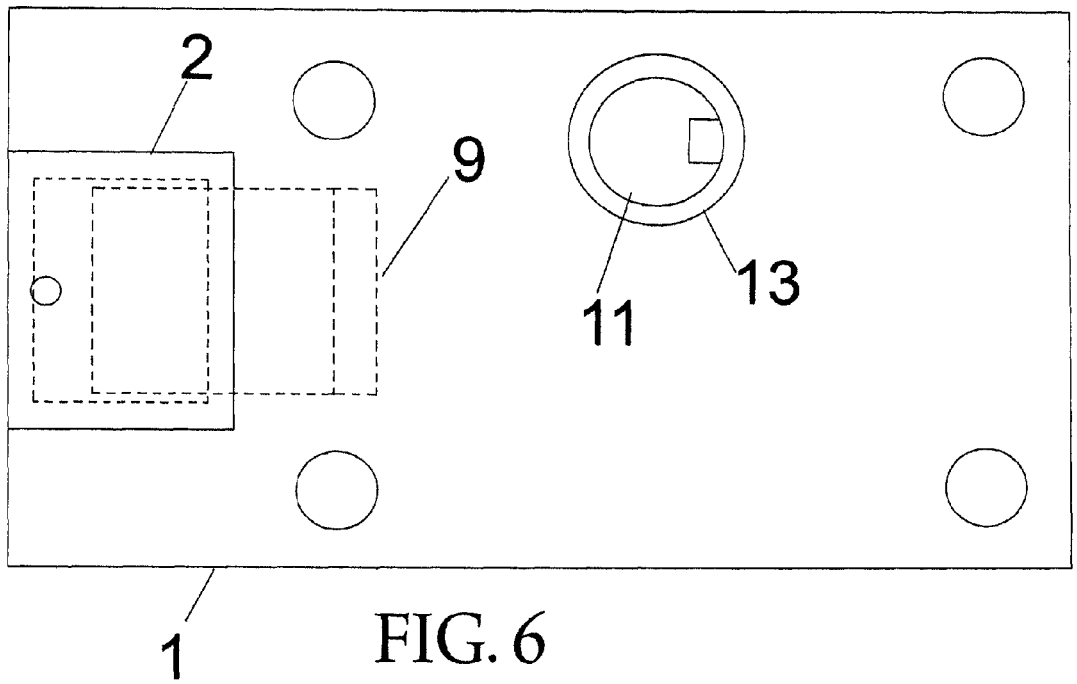
FIG. 6 is a top view of the base plate of FIG. 5.
Figure 7:
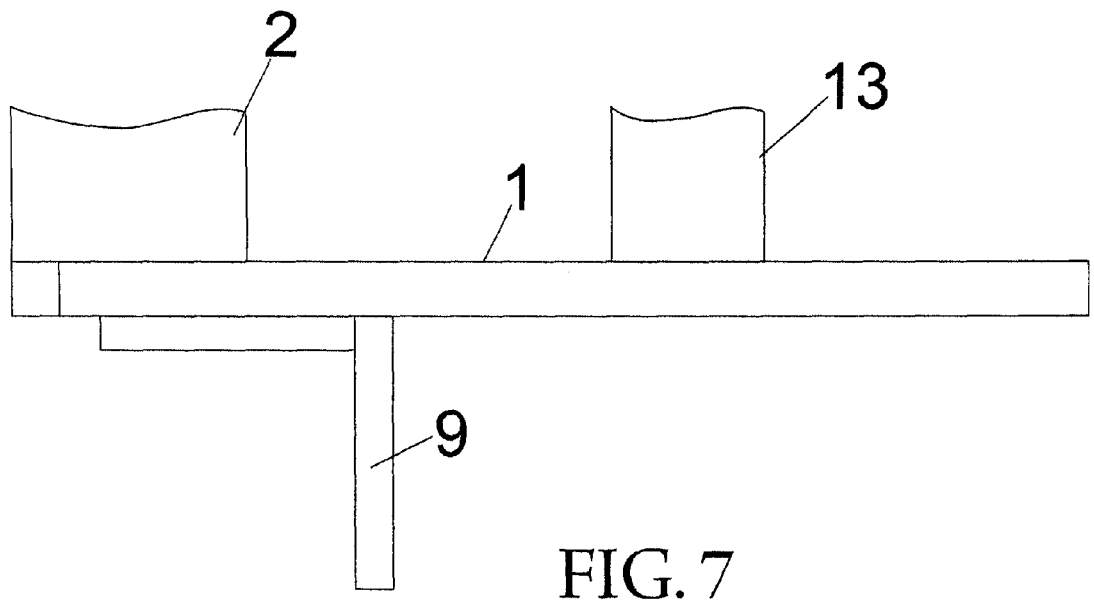
FIG. 7 is front view of the base plate of FIG. 5. The base plate includes an L-shaped load support that engages a side of the tongue of the boat trailer and helps the base plate withstand the load created by the user when going up and down the steps.

Base plate 1 preferably includes an "L" shaped load support 9 which engages a side of trailer tongue 24 and serves to strengthen and help base plate 1 withstand the load created by the user going up and down the steps 29. See FIGS. 6, 7 & 9. Base plate 1 receives a set of bolts that pass through base plate 1 and continue down and through a lower base plate 10 that physically engages the underside of trailer tongue 24. See FIG. 3. The combination of the base plate 1, load support 9, lower base plate 10, and bolts essentially "box in" trailer tongue 24, creating the structural foundation for step assist 25.

Figure 8:
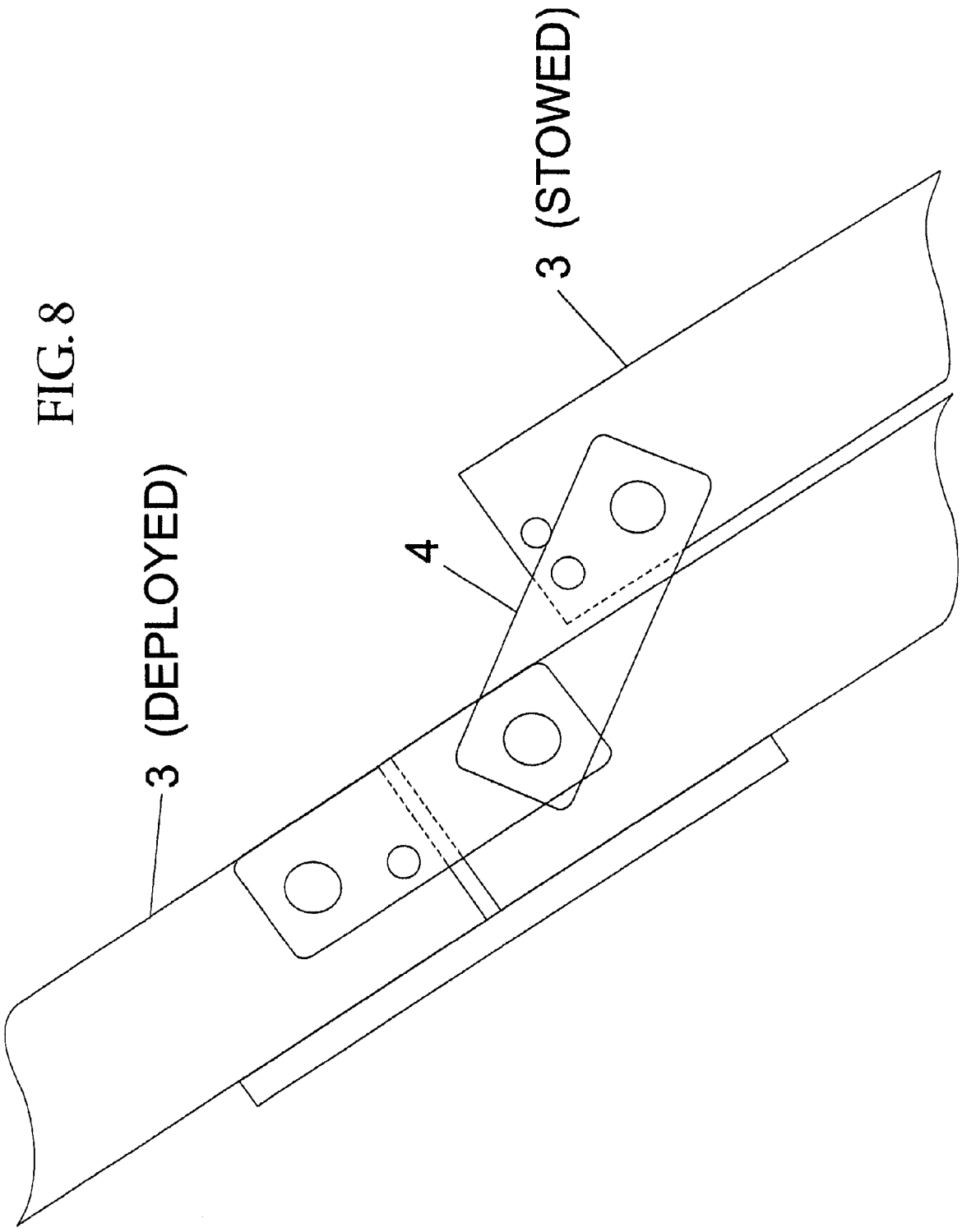
FIG. 8 is a side view of the step assist of FIG. 1 illustrating the hinge that allows the upper support arm to be rotated down to rest on the lower support arm. A locking means, such as a wire lock pin (see FIG. 9), secures the upper support arm when in use or when folded down for storage.

Turning now to FIG. 8, hinge 4 may include locations for a wire lock pin or similar locking means (not shown) to be inserted through both hinge and the upper support arm 3 The wire lock pin serves to secure support arm 3 when in use or when folded down for storage.

Figure 9:
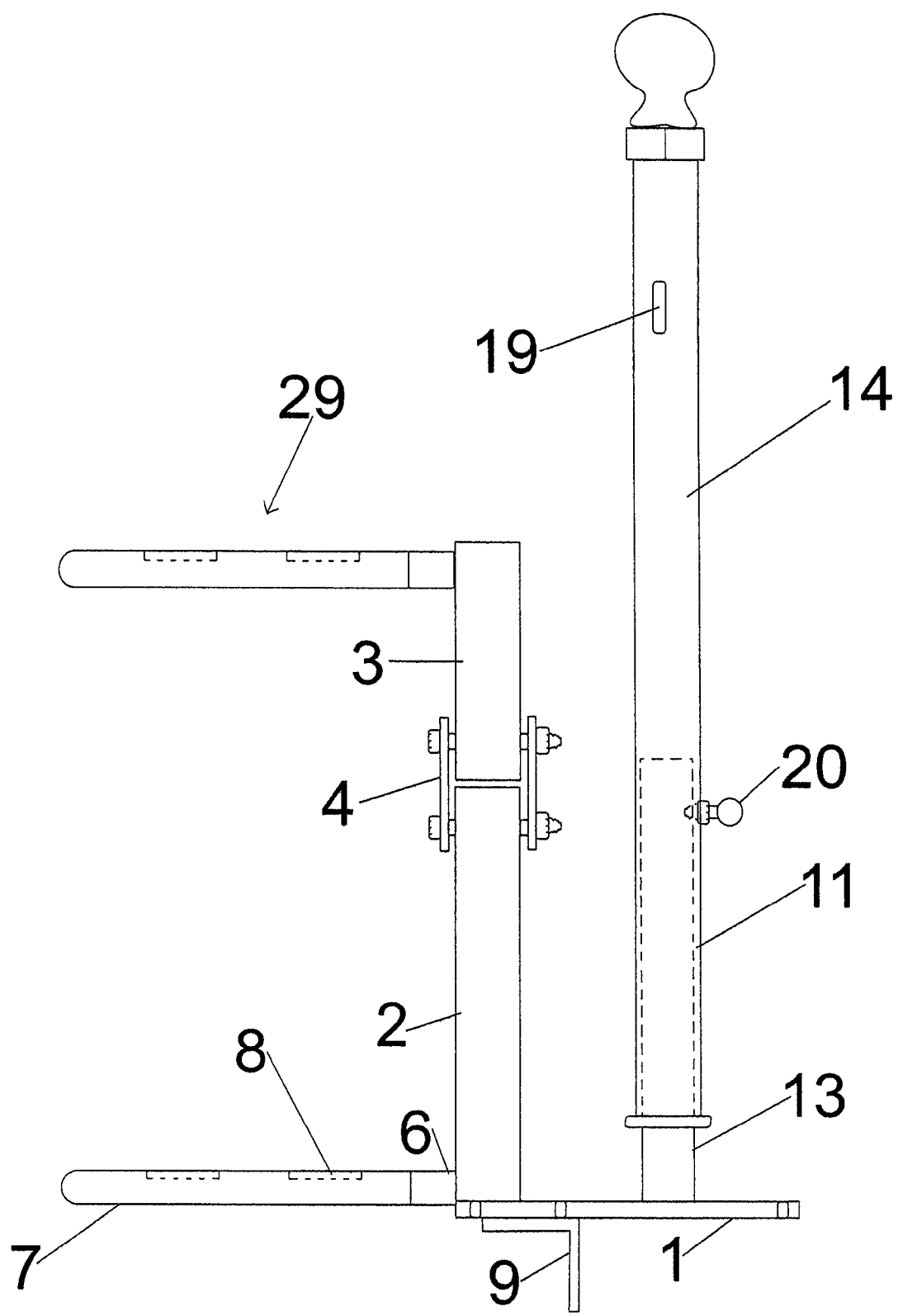
FIG. 9 is a front view of the step assist of FIG. 1 illustrating all of the primary components of the step assist in relation to one another.

Referring to FIG. 9, grab handle 14 may be an adjustable grab handle and removable. See also FIG. 3. In a preferred embodiment, grab handle 14 includes a vertical grab handle pin 11. Pin 11 has a removable grab handle stop ring 13 to assist stability and allows adjustment holes in removable grab handle 14 and vertical grab handle pin 11 to overlap and align for wire lock pin 20 or similar locking means to be inserted. Wire lock pin 20 may be removed from removable grab handle 14 quickly and easily to permit removable grab handle 14 to be lifted off of vertical grab handle pin 11 for purpose of preventing theft and ease of storage. Grab handle 14 may also include tabs 19 for receiving a mirror 27 as shown in FIGS. 1 & 2.

The various components of step assist 25 as described above may be made of a strong metal, metal alloys, composites, strong polymers, composite material, wood, or similar types of material. In a preferred embodiment, step assist 25 is constructed of low carbon steel of various configurations such as plate, flat bar, pipe, round bar, square bar, square tubing and rectangular tubing that are cut, cleaned drilled, fit and welded as necessary.

Aesthetics being considered, step assist 25 may be advantageously colored to match the boat 22 or trailer 23 of the user. When in metal faun, step assist 25 involves blasting after fabrication by use of grit, sand or metal shot; applying a primer coat to allow paint to adhere; and then applying paint such as spray, powder coat and the like. Step assist 25 may also have a clear coat applied over the paint to increase durability for the user if preferred.

This description is to allow practice of the invention by those of ordinary skill in the art, without experimentation, including the best methods currently disclosed and the presently preferred embodiments. Nothing in this description is to be taken to limit the scope of the invention, which is subject to alterations, substitutions or equivalents.

What is claimed is:

1. A boat trailer step assist comprising:
    a lower support arm connected to a base plate and an upper support arm, the upper support arm having a stowed position and a deployed position;
    a grab handle being connected to the base plate and extending away from the base plate at an angle normal to the base plate;
    at least two steps being connected to the support arms and, when in use, not being in the same vertical plane as the trailer tongue, each of the two steps being greater in width than a width of the support arms, one step being connected to the lower support arm, and the other step being connected to the upper support arm;
    wherein a top end of the grab handle is at a higher elevation than the step which is connected to the upper support arm;
    wherein the base plate is connected to a trailer tongue; and
    wherein, to transition from the deployed position to the stowed position, a forward face of the upper support arm is rotated downward to contact a forward face of the lower support arm.

2. A boat trailer step assist according to claim 1 further comprising the lower support arm being oriented at an oblique angle to the trailer tongue.

3. A boat trailer step assist according to claim 1 further comprising the upper and lower support arms being in coaxial alignment when the upper support arm is in the deployed position.

4. A boat trailer step assist according to claim 1 further comprising at least one of the steps being oriented so the step lies in a same horizontal plane substantially as the trailer tongue.

5. A boat trailer step assist according to claim 1 further comprising a grab handle, the grab handle being a grab handle selected from the group consisting of a fixed grab handle and a removable grab handle.

6. A boat trailer step assist according to claim 1 further comprising the grab handle being an adjustable grab handle.

7. A boat trailer step assist according to claim 1 further comprising a mirror connected to the grab handle.

\* \* \* \* \*